Patented July 6, 1926.

1,591,084

UNITED STATES PATENT OFFICE.

EMILIO M. FLORES, OF BUENOS AIRES, ARGENTINE REPUBLIC.

DENATURED ALCOHOL.

No Drawing. Application filed June 9, 1922, Serial No. 567,169, and in Argentine Republic June 13, 1921.

This invention relates to a novel process for making denatured ethyl alcohol suitable for use for industrial purposes, such as heating, lighting and the like.

Notwithstanding the complex nature of similar denatured products they may be separated more or less easily as it is possible to recover the ethyl alcohol content.

This objection and drawback is entirely eliminated by my process, by the use of which it is possible to make an alcoholic fuel from which the alcohol cannot be separated with practicable profit.

I use crude wood alcohol containing acetone, the varying percentages of acetone permitted therein depending upon the industrial use to be made of the final product, as well as the degree of water content of the raw material. I add to the fermented mash or the crude or refined ethyl alcohol one percent of a fraction of mineral oil distilling between 40° C. and 150° C.

I mix these three ingredients, namely ethyl alcohol of any desired concentration, crude methyl alcohol one percent and of the above mentioned mineral oil fraction one percent. This mixture is placed in vats of wood or metal and allowed to stand forty-eight hours and distilled to bring the distillate to a concentration suitable for fuel and of a definite boiling point, and neither during distillation nor afterwards is there any separation of the constituents.

The distillate has a peculiar, disagreeable odor and taste, for which reason these ingredients have been chosen for the fuel.

The distillate is difficult to separate by fractional distillation.

I claim:

The method of making denatured ethyl alcohol, which comprises adding to a crude ethyl alcohol one percent of crude wood alcohol containing acetone and one percent of a light-fraction of mineral oil distilling between 40° C. and 150° C.

In testimony that I claim the foregoing as my invention, I have signed my name.

EMILIO M. FLORES.